(12) United States Patent
Schall et al.

(10) Patent No.: US 6,827,959 B1
(45) Date of Patent: Dec. 7, 2004

(54) MYCOTOXIN ADSORBENTS

(75) Inventors: Norbert Schall, Langenpreising (DE); Hubert Simmler-Hübenthal, Moosburg (DE); Herrmann Gerardo Feldhaus, Pedregal de San Angel (MX)

(73) Assignee: Sud-Chemie AG, Munich (DE)

( * ) Notice: Subject to any disclaimer, the term of this patent is extended or adjusted under 35 U.S.C. 154(b) by 0 days.

(21) Appl. No.: 09/889,015

(22) PCT Filed: Dec. 17, 1999

(86) PCT No.: PCT/EP99/10088

§ 371 (c)(1),
(2), (4) Date: Sep. 26, 2001

(87) PCT Pub. No.: WO00/41806

PCT Pub. Date: Jul. 20, 2000

(30) Foreign Application Priority Data

Jan. 12, 1999 (DE) .......................... 199 00 813

(51) Int. Cl.⁷ .......................... A23K 1/175; A23K 1/00
(52) U.S. Cl. ...................... 426/286; 426/807
(58) Field of Search ................. 426/286, 807

(56) References Cited

U.S. PATENT DOCUMENTS

| | | | |
|---|---|---|---|
| 4,925,669 A | * | 5/1990 | Dyer et al. .................. 424/438 |
| 5,178,832 A | * | 1/1993 | Phillips et al. ................ 422/60 |
| 5,192,547 A | * | 3/1993 | Taylor .......................... 424/438 |
| 5,304,706 A | | 4/1994 | Hooykaas .................... 588/252 |
| 5,935,623 A | * | 8/1999 | Alonso-Debolt ............... 426/2 |

FOREIGN PATENT DOCUMENTS

WO  WO 91/13555  9/1991

OTHER PUBLICATIONS

A.J. Ramos, J. Fink–Gremmels, E. Hernandez, Prevention of Toxic Effects of Non–nutritive Adsorbent Compounds, J. of Food Protection, vol. 59(6), 1996, pp. 631–641).

S.L. Lemke, P.G. Grant, and T.D. Phillips describe in Adsorption of Zearalenone by Organophilic Montmorillonite Clay, J. Agric. Food Chem. (1998), pp. 3787–3796.

S.L. Lemke, S.E. Ottinger, and T.D. Phillips, Book of Abstracts, 216th ACS National Meeting, Boston, 1998.

Ullmann's Encyclopedia of Industrial Chemistry, vol. 21, pp. 370–375 (1982).

* cited by examiner

*Primary Examiner*—C. Sayala
(74) *Attorney, Agent, or Firm*—Scott R. Cox

(57) ABSTRACT

Mycotoxin adsorbents are produced containing an organically modified (organophilic) layered silicate, in which quaternary onium compounds contain at least one $C_{10}$ to $C_{22}$ alkyl group and at least one aromatic substituent, or containing a mixture of not organically modified silicate and a layered silicate organically modified at least to 75%, referring to the total cation exchange capacity (CEC) of the layered silicate.

23 Claims, No Drawings

MYCOTOXIN ADSORBENTS

BACKGROUND OF INVENTION

1. Field of Invention

The present invention concerns a mycotoxin adsorbent, especially for adsorption of aflatoxins and other mycotoxins (non-aflatoxins) in cereals, grains and animal feeds.

2. Prior Art

The term mycotoxin encompasses a group of toxic substances that are formed by different naturally occurring fungi. About 300 to 400 mycotoxins are now known. Cereals and grains are generally considered the natural environment for these fungi. Whereas some types of fungi develop in the still-maturing grain, other types primarily attack grain supplies being stored when a certain minimum moisture and ambient temperature conditions are present.

All so-called mycotoxins have a health-hazardous effect primarily on agricultural animals fed with infected grain, but secondarily on humans as well via the food chain. For example, aflatoxins are responsible for the so-called X-disease of turkeys, which destroyed about 100,000 animals in Great Britain in 1960/61, which had been fed with moldy peanut flour.

Some of the most important mycotoxins are:

Aflatoxins $B_1$, $B_2$, $G_1$, $G_2$: these are formed by various Aspergillus species. Aflatoxin $B_1$ is carcinogenic even in microgram amounts and causes stomach and liver damage.

Ochratoxin is formed by *Aspergillus ochraceus* and *Penicillium viridicatum* and causes kidney damage.

Zearalenone is formed by *Fusarium graminearum*, which grows on corn, barley and wheat. It is an estrogen-like substance that causes fertility disorders and is suspected to be carcinogenic.

Fumonisine is formed by fungi of the genus Fusarium and has been implicated, among other things, in horse deaths.

T2 toxins and T2-like toxins (tricothecenes) are formed by fungi of the genus Fusarium.

Moreover, there are a number of additional mycotoxins, like deoxynivalenol, diacetoxyscirpenol, patuline, citrinine, byssochlamic acid, ochratoxin, sterigmatocystine, monilifomine, ergot alkaloids, ergochrome, cytochalasane, penicillinic acid, zearalenone, rubratoxins, trichothecenes (cf. Römpps, Chemie-Lexikon, $8^{th}$ Edition, 1985, page 2888), and others, which occur in concentrations that cause health problems in feeds only in isolated circumstances.

Several different toxins that are recognized as causal agents of health problems in humans and animals can be discovered in different feeds by the utilization of sensitive analysis methods. A number of studies have been able to demonstrate that several toxins can occur simultaneously in feeds. This simultaneous occurrence can significantly influence the toxicity of the mycotoxins. In addition to acute damage to agricultural animals that receive mycotoxin-contaminated feed, health impairment in humans has also been discussed in the literature. Such impairment develops after long-term intake of foods, even weakly contaminated with mycotoxins.

In a recent study of suspected feed samples, aflatoxin, deoxynivalenone or fumonisine were found in more than 70% of the investigated samples (cf. Understanding and Coping with Effects of Mycotoxins in Live Dog Feed and Forage, North Carolina Cooperative Extension Service, North Carolina State University; http:/www.ces.ncsu.edu/drought/dro-29.html).

In many cases, the economic effects relative to reduced productivity of the animals, increased occurrence of disease by immune suppression, damage to vital organs and an adverse effect on reproductivity are even greater than the effects caused by death of the animals by mycotoxin intoxication.

A group of aflatoxins can be adsorbed with high specificity by some absorbents, like zeolite, bentonite, aluminum silicate and others, because of their specific molecular structure (cf. A. J. Ramos, J. Fink-Gremmels, E. Hernandez, Prevention of Toxic Effects of Mycotoxins by Means of Non-nutritive Adsorbent Compounds, J. of Food Protection, Vol. 59(6), 1996, page 631–641). However, this is not true for most other mycotoxins. An attempt has been made to expand the adsorption capacity of mineral adsorbents for non-aflatoxins as well.

A dry particulate animal feed additive is described in WO 91/13555, which contains phyllosilicate particles that are coated with a sequestering agent. An increase in sorption rate can be achieved by this process, but complete (>90%) elimination of the introduced toxins cannot be achieved.

Good results are also described in the prior art with ion exchange resins or high-quality activated carbon, but such solutions are not practical for cost reasons.

Organophilic clays are used, among other things, in the prior art, to treat liquid wastes with organic contaminants, in order to solidify them and facilitate their disposal (cf. EP-0,560,423).

S. L. Lemke, P. G. Grant and T. D. Phillips describe in Adsorption of Zearalenone by Organophilic Montmorillonite Clay, J. Agric. Food Chem. (1998), pages 3787–3796 an organically modified acid montmorillonite clay, which is capable of adsorbing zearalenone. The best adsorption rates were exhibited by clays that were exchanged with cations containing $C_{16}$ alkyl groups, namely, hexadecyltrimethylammonium (HDTMA) and cetylpyridinium (CP). Noticeable adsorption rates were only achieved from a coating with a cation exchange capacity (CEC) of more than about 75%.

The use of organically modified clay for adsorption of fumonisine B1 is described in Lemke, S. L., Ottinger, S. E. and Phillips, T. D., Book of Abstracts, $216^{th}$ ACS National Meeting, Boston, 1998. Quaternary ammonium compounds having a $C_{16}$ alkyl group are used for organophilization.

The task of the present invention is to prepare an adsorbent based on layered silicates (phyllosilicates) that adsorbs not only aflatoxins, but also other important mycotoxins (non-aflatoxins) with high efficiency and, at the same time, is cost-effective so that it can be used in practice. The adsorbent also exhibits stable adsorption of mycotoxins under physiological conditions, as occur, for example, after absorption with the feeds in the digestive tract of animals.

SUMMARY OF INVENTION

It was surprisingly found that, by appropriate modification of a layered silicate or part of it, mycotoxin adsorbents can be produced that can effectively adsorb both aflatoxins and non-aflatoxins, like zearalenone, ochratoxin, deoxynivalenone, T2 toxins or fumonisine, which are also cost-effective.

DETAILED DESCRIPTION OF PREFERRED EMBODIMENT

According to a first aspect of the invention, by modification of a layered silicate with a quaternary onium compound with a long-chain $C_{10}$ to $C_{22}$ alkyl group and at least one aromatic substituent, a significant increase in adsorption performance of such a material for mycotoxins can be achieved even with use of relatively limited amounts thereof.

The layered silicates listed in Ullmann's Encyclopedia of Industrial Chemistry, Vol. 21, pages 370–375 (1982) fall under the layered silicates employable as the adsorbent according to the invention. In particular, the activatable natural and synthetic clay minerals, like smectites, including montmorillonite, beidellite, nontronite, volkonskoite, stevensite, hectorite, swinefordite, saponite and sauconite, the vermiculites, illites, mixed layer minerals, palygorskite (attapulgite) and sepiolite, can be used. The two last-named minerals are also called hormites.

According to a preferred variant of the invention, the layered silicate is a three-layered silicate, for example, a naturally occurring smectitic clay, especially a bentonite clay. Swellable layered silicates with a relatively high swelling volume are preferred, in particular, like calcium bentonites with a swelling volume of about 10 mL/g or more, or layered silicates converted by ion exchange to the $Na^+$ form with a swelling volume of about 20 mL/g or more. It is assumed that the specific adsorption performance is positively influenced by high swellability. However, acid-activated bentonites can also be used.

It was found that very good adsorption performance can be achieved for mycotoxins even at an exchange rate well below 75% of the cation exchange capacity (CEC) of the layered silicate. Even when the exchange rate is as low as 2 to 30%, preferably 2 to 15%, especially 2 to 10%, of the CEC, the adsorbents according to the invention exhibit significant adsorption for mycotoxins.

According to a preferred variant, for example, a bentonite with a cation exchange capacity from 5 to 100 meq/100 g can be uniformly coated with onium ions corresponding to about 3 to 15 meq/100 g.

Quaternary ammonium compounds and pyridinium compounds can be used, in particular, as quaternary onium compounds. All onium compounds are suitable for organic modification of layered silicates that are known to one skilled in this field can be used if the quaternary onium compounds contain (at least) a long chain $C_{10}$ to $C_{22}$ alkyl group and at least one aromatic substituent. The quaternary onium compounds can also contain an aralkyl substituent (as aromatic substituent).

According to a preferred variant, stearyl (tallow)-benzyldimethylammonium chloride ($C_{16}$–$C_{18}$ DMBA) is used as quaternary ammonium compound. Additional preferred onium compounds are:

Coconut alkyldimethylbenzylammonium chloride ($C_{12}$–$C_{16}$ DMBA)

Dimethyllaurylbenzylammonium chloride ($C_{12}$–$C_{14}$ DMBA)

Distearylmethylbenzylammonium chloride ($C_{16}$–$C_{18}$ DMBA)

Quaternized tallow imidazolinium methosulfate.

The quaternary onium compounds can be used either directly or formed in situ during activation of the layered silicate by combined use of secondary and tertiary amines. It is assumed that the aromatic group(s) and the long chain alkyl group of the quaternary onium compound cooperate to achieve the advantageous adsorption performance. Without restricting the present invention to a theoretical mechanism, it is assumed that the vicinal or isolated carbonyl groups present in nearly all mycotoxins interact with the adsorbents according to the invention.

In addition to improved adsorption performance of mycotoxins, it was also found that the adsorbents according to the invention exhibit an efficient and stable adsorption of mycotoxins during a reduction of the pH values, as occurs, for example, during uptake of feeds in the acid gastric medium of a monogastric animal, or on transition from an acid to neutral or slightly alkaline pH value, as occurs during passage of the food slurry through the digestive tract.

According to a second aspect of the invention, the mycotoxin adsorbent contains a mixture of an organically modified layered silicate and a not organically modified layered silicate, in which the organically modified layered silicate in the mixture is exchanged at least 75% (referred to the total CEC) with a quaternary onium compound.

The layered silicates used according to this variant of the invention correspond to those mentioned above.

It was found that, according to this variant of the invention, even when quaternary onium compounds containing no aromatic substituents are used, good adsorption performance for mycotoxins can be achieved. In principle, all onium compounds suitable for organic modification of layered silicates that are known to one skilled in this field can be used. However, those quaternary ammonium compounds that have (at least) one long chain $C_{10}$–$C_{22}$ alkyl group and preferably at least one aromatic substituent, as described above, are preferred.

Generally, the mixture will contain about 0.1 to 50 wt. %, especially about 0.5 to 20 wt. %, of organically modified layered silicate. It was surprisingly found that, even at a fraction of more than about 2 wt. % organically modified layered silicate in the mixture, almost complete (more than 90%) adsorption of mycotoxins (aflatoxins and non-aflatoxins) occurs even at acid pH values. It is therefore assumed, without restricting the invention to a theoretical mechanism, that the hydrophobic surface of the organically modified layered silicate and the surface of the unmodified layered silicate interact during effective adsorption and slight desorption of mycotoxins. For example, it is assumed that the aflatoxins primarily bind to the unmodified layered silicate in a mixture of organically modified and unmodified layered silicate, so that the surface of the organically modified layered silicate is available for adsorption of the non-aflatoxins that cannot be adsorbed on the unmodified layered silicate. Good adsorption performance with respect to non-aflatoxins is therefore also guaranteed at relatively high aflatoxin concentrations.

Since the organically modified layered silicate represents the most costly portion of the mixture, the smallest possible fraction of organically modified layered silicate is chosen in the mixture under practical conditions, but one in which good adsorption performance is observed. The optimal fraction of organically modified or unmodified layered silicate can be determined in individual cases by one skilled in the art by means of a routine experiment.

According to a preferred variant, however, generally about 0.5 to 30 wt. %, especially to 15 wt. %, most especially to 10 wt. %, of organically modified layered silicate is used in the mixture.

Adsorption of mycotoxins in an aqueous solution remains stable even during a reduction of the pH value or a transition from acid to neutral or slightly alkaline pH, as occurs under physiological conditions during digestion of feed, i.e., the desorption rate is low.

Another advantage of the adsorbent mixture according to the invention is that, because of the relatively limited fraction of organically modified layered silicate in the mixture, desired hydrophobic substances, like lipophilic vitamins or essential fatty acids, are only bound to a limited degree to the adsorbent and are therefore available for resorption in the digestive tract.

The same advantage is obtained during relatively limited exchange in the case of use of a partially organically modified layered silicate.

According to another aspect of the invention, a feed additive that contains the adsorbent according to the invention is prepared.

It is also possible to produce premixes that contain a fairly high percentage of more than about 50% organically modified layered silicate which are mixed in a second step to produce an adsorbent according to the invention or a feed additive with an unmodified layered silicate.

The mycotoxin adsorbents according to the invention can contain additional components that appear useful for the corresponding application, for example, feed supplements or agents for (enzymatic) detoxification of mycotoxins.

EXAMPLES

The cation exchange capacity was determined as follows.

5 g of clay was screened through a 63 μm sieve and dried at 110?C. Precisely 2 g was then weighed out and mixed with 100 mL of 2 N $NH_4Cl$ solution. The suspension was boiled under reflux for an hour. After standing for about 16 hours, the $NH_4^+$ clay was filtered off via a membrane suction filter and washed with deionized water (about 800 mL) to remove the ions. Detection of effective elimination of ions of the wash water was carried out for $NH_4^+$ ions with the Nessler reagent sensitive to this (Merck company). The washed out $NH_4^+$ clay was taken up by the filter, dried at 110?C. for 2 hours, ground, screened (63 μm sieve) and dried again at 110?C. The $NH_4^+$ content of the bentonite was then determined according to Kjeldahl. The CEC of the clay is the $NH_4^+$ content of the NH4+clay determined by the Kjeldahl method. The data are given in meq/100 g of clay.

The invention is now explained by means of the following examples.

The different mycotoxins were acquired as crystalline pure substances (SIGMA AG) and taken up in methanol or acetonitrile (50 μg/mL). To perform the adsorption experiment, dilutions were produced using buffer solutions (dipotassium hydrogen phosphate+citric acid), each of which contained 100 μg of the different toxins per liter.

Example 1

A natural Ca bentonite was used for the adsorption experiment, having a cation exchange capacity of 90 meq/100 g. Complete exchange of the interlayer cation (100% of the CEC) occurred according to the prior art (S. L. Lemke, P. G. Grant and T. D. Phillips, "Adsorption of Zearalenone by Organophilic Montmorillonite Clay", J. Agric. Food Chem. (1988), page 3790) with the following quaternary ammonium ions:

CP: Cetylpyridinium chloride
HDTMA: Hexadecyltrimethylammonium chloride
SBDMA: Stearylbenzyldimethylammonium chloride
ODDBMA: Octadecyldibenzylmethylammonium chloride The organophilized bentonites were dried and finely ground, so that the residue on a 90 μm sieve was less than 10%. They were then added in an amount of 0.02 wt. % to mycotoxin-containing aqueous solutions (100 mL), each of which contained 100 μg of the three mycotoxins aflatoxin B1, ochratoxin A and zearalenone in 1 L of aqueous solution (pH 7).

The suspensions so produced were shaken at room temperature for 1 hour upside down, and then centrifuged for 5 minutes at 1500 rpm. The clear supernatant was extracted with 2 mL hexane and the hexane phase investigated by HPLC for the amounts of toxins remaining in the solution.

HPLC determination occurred under the following conditions:

| Column: | Spherisorb ODS-2 125 ? 4 mm |
|---|---|
| Mobile phase: | |
| Aflatoxin: | 600 mL of a 1 mmol NaCl solution/ |
| | 200 mL acetonitrile/ |
| | 200 mL methanol |
| Ochratoxin: | 570 mL acetonitrile/410 mL water/ |
| | 20 mL acetic acid |
| Zearalenone: | 570 mL acetonitrile/410 mL water/ |
| | 20 mL acetic acid |
| Flow rate: | 1.5 mL/min |
| Detector: | Fluorescence |
| Wavelength: | EX 365 nm/EM 455 nm |
| Furnace temperature: | 30?C. (aflatoxin, ochratoxin); |
| | 40?C. (zearalenone). |

The percentage adsorption rates were calculated by means of the results. The obtained results are summarized in Table 1.

TABLE I

Effect of onium ion of different organoclays on adsorption of mycotoxins

| | Aflatoxin B1 Adsorption [%] | Zearalenon Adsorption [%] | Ochratoxin Adsorption [%] |
|---|---|---|---|
| 100% CP-Organoton | 65.4 | 43.5 | 38.7 |
| 100% HDTMA-Organoton | 78.2 | 45.8 | 46.1 |
| 100% SBDMA-Organoton | 88 | 78.3 | 82.5 |
| 100% ODDBMA-Organoton | 86.5 | 82.8 | 85.4 |

Zearalenon = Zearalenone
Organoton = Organclay

It is apparent from Table I that the mycotoxin adsorbents according to the invention adsorbed both aflatoxins and non-aflatoxins much better than the CP and HDTMA organoclays according to the prior art.

Example 2

The bentonites modified with CP, HDTMA or SBDMA, produced as described in Example 1, were mixed with natural unmodified Ca bentonite (cf. Example 1 above) with comparable particle fineness in the following ratio: 96 wt. % Ca bentonite+4 wt. % organoclay.

The organophilized bentonites were added to mycotoxin-containing aqueous solutions (100 mL) in an amount of 0.5 wt. %, each of the solutions containing 100 μg of the three mycotoxins aflatoxin B1, ochratoxin A and zearalenone in 1 L of aqueous solution (pH 7).

The suspensions so produced were shaken upside down at room temperature for 1 hour, and then centrifuged for 5 minutes at 1500 rpm. The clear supernatant was extracted with 2 mL hexane and the hexane phase investigated, as in Example 1, by HPLC.

The percentage absorption rates were calculated by means of the results. The obtained results are summarized in Table 2.

TABLE II

Effect of onium ion of different organoclays in clay mixtures on adsorption of mycotoxins

|  | Aflatoxin B1 Adsorption [%] | Zearalenon Adsorption [%] | Ochratoxin Adsorption [%] |
|---|---|---|---|
| 100% Ca-Bentonit | 90.1 | 18.3 | 11.8 |
| 96% Ca-Bentonit |  |  |  |
| +4% CP-Organoton | 90.3 | 61.3 | 57.6 |
| +4% HDTMA-Organoton | 89.2 | 62.4 | 65.7 |
| +4% SBDMA-Organoton | 90.6 | 90.4 | 93.2 |

Zearalenon = Zearalenone
Bentonit = Bentonite
Organoton = Organclay

It is apparent from Table II that the mycotoxin adsorbent according to the invention, which contains a mixture of unmodified bentonite with SBDMA organically modified bentonite almost fully adsorbed both aflatoxins and the non-aflatoxins in contrast to the adsorbents according to the prior art.

Example 3

A bentonite modified with SBDMA, produced as described in Example 1, was mixed with natural unmodified Ca bentonite with comparable grain fineness in the weight ratios listed in the following Table III.

The mixtures so obtained were added in an amount of 0.5 wt. % to mycotoxin-containing aqueous solutions (100 mL), each of which contained 100 $\mu$g of the three mycotoxins aflatoxin B1, ochratoxin A and zearalenone in 1 L of aqueous solution at pH 3 or pH 7.

The suspensions so produced were shaken upside at room temperature for 1 hour, and then centrifuged for 5 minutes at 1500 rpm. The clear supernatant was extracted with 2 mL hexane and the hexane phase investigated, as described in Example 1, by HPLC.

The percentage adsorption rates were calculated by means of the results. The obtained results are summarized in Table III.

TABLE III

Mycotoxin adsorption on mixtures of unmodified and organically modified bentonite

|  | Aflatoxin B1 Adsorption [%] | | Zearalenon Adsorption [%] | | Ochratoxin Adsorption [%] | |
|---|---|---|---|---|---|---|
|  | pH 7 | pH 3 | pH 7 | pH 3 | pH 7 | pH 3 |
| Anteil SBDMA-Organoton in Ca-Bentonit |  |  |  |  |  |  |
| 0% | 90.1 | 96.1 | 18.3 | 29.5 | 11.8 | 19.2 |
| 2% | 92.1 | 95.4 | 82 | 89.8 | 79.4 | 84.8 |
| 3% | 90 | 96.3 | 88.9 | 92.3 | 90.7 | 88.5 |
| 4% | 90.6 | 96 | 90.4 | 91.7 | 93.2 | 90.2 |
| 6% | 91.9 | 95.8 | 90.8 | 93.4 | 95.5 | 90.5 |

Zearalenon = Zearalenone
Left: Percentage of SBDMA organoclay in Ca bentonite

It is apparent from Table III that a very good adsorption of even the non-aflatoxins could be achieved with just 2 wt. % SBDMA organoclay in the mixture.

Example 4

An organophilized SBDMA bentonite was produced generally as described in Example 1, less SBDMA being used for modification, in order to achieve uniform exchange at a level of 8% of the CEC of bentonite.

An SBDMA bentonite exchanged to 100% of the CEC, produced as described in Example 1, was also mixed with natural unmodified Ca bentonite with comparable particle fineness in a ratio of 96 wt. % Ca bentonite+4 wt. % SBDMA organoclay.

500 mg of the different adsorbents were metered into each 100 mL of aqueous toxin solution, which corresponds to an amount of 0.5%, referred to the supplied solution.

The suspensions so produced were shaken upside down at room temperature for 1 hour and then centrifuged for 5 minutes at 1500 rpm. The clear supernatant was extracted with 2 mL hexane and the hexane phase investigated, as described in Example 1, by HPLC.

For the desorption experiments, the solid obtained after centrifuging and separation of the liquid phase was resuspended in 100 mL of a fresh buffer solution with the desired pH value, the suspension shaken upside down at room temperature for 1 hour and treated further as described above.

TABLE IV

Adsorption/desorption behavior and its influencing by the pH value of the medium

|  | Adsorption/Desorption an SBDMA-Organoton, belegt mit 8% der KAK | Adsorption/Desorption an Gernisch aus Ca-Bentonit +4% SBDMA-Organoton |
|---|---|---|
| Aflatoxin B1 |  |  |
| Adsorption bei pH 7 | >97.5% | >97.5% |
| Desorption I bei pH 3 | <2.5% | <2.5% |
| Desorption II bei pH 7 | <2.5% | <2.5% |
| Ochratoxin |  |  |
| Adsorption bei pH 7 | 87.5% | 93.2% |
| Desorption I bei pH 3 | 7.2% | 3.2% |
| Desorption II bei pH 7 | 5.1% | 4.6% |

Headings, Left to Right:
Adsorption/desorption on SBDMA organoclay coated with 8% CEC;
Adsorption/desorption on mixture of Ca bentonite + 4% SBDMA organoclay
bei = at It is apparent from the table that very good adsorption rates were achieved at pH 7 both with the SBDMA organoclay exchange to 8% of the CEC and the mixture of 96% Ca bentonite and 4% SBDMA organoclay. Only very limited desorption occurred both during the reduction in pH value of the medium to pH 3 and subsequent rise of the pH value again to 7. Because of this, stable adsorption is demonstrated on the organoclays and organoclay mixtures according to the invention.

For the nonorganically modified bentonite, the adsorption rate was <20% for ochratoxin and the overall desorption (I+II) was >40%. When fully exchanged SBDMA organoclay was used, complete adsorption >97.5% was achieved for aflatoxin and ochratoxin, the desorptions (I, II) were <2.5%.

What is claimed is:
1. A mycotoxin adsorbent comprising
an organically modified (organophilic) layered silicate comprising a quaternary onium compound, wherein said quaternary onium compound includes at least a $C_{10}$ to $C_{22}$ alkyl group and an aromatic substituent, and wherein about 2 to about 30 percent of exchangeable cations of the layer silicate are exchanged with quaternary onium compounds.

2. A mycotoxin adsorbent comprising
a mixture of a layered silicate, which has not been organically modified, and a layered silicate, which has been organically modified to at least about 75 percent of its total cation exchange capacity (CEC), wherein the organically modified layered silicate comprises from about 0.1 to about 50 percent of the mixture.

3. The mycotoxin adsorbent of claim 2 wherein the organically modified layered silicate comprises a quaternary onium compound including at least a $C_{10}$ to $C_{22}$ alkyl group and at least one aromatic substituent.

4. The mycotoxin adsorbent of claim 1 wherein the $C_{10}$ to $C_{22}$ alkyl group comprises a $C_{14}$ to $C_{18}$ alkyl group.

5. The mycotoxin adsorbent of claim 3 wherein the $C_{10}$ to $C_{22}$ alkyl group comprises a $C_{14}$ to $C_{18}$ alkyl group.

6. The mycotoxin adsorbent of claim 1 wherein the quaternary onium compound is selected from a group consisting of stearylbenzyldimethylammonium chloride, coconut alkyldimethylbenzylammonium chloride, dimethyllaurylbenzylammonium chloride, distearylmethylbenzylammonium chloride or quaternized tallow imidazolinium methosulfate is used as quaternary onium compound.

7. The mycotoxin adsorbent of claim 3 wherein the quaternary onium compound is selected from a group consisting of stearylbenzyldimethylammonium chloride, coconut alkyldimethylbenzylammonium chloride, dimethyllaurylbenzylammonium chloride, distearylmethylbenzylammonium chloride or quaternized tallow imidazolinium methosulfate is used as quaternary onium compound.

8. The mycotoxin adsorbent of claim 1 wherein the organically modified layered silicate comprises a smectite clay mineral.

9. The mycotoxin adsorbent of claim 2 wherein the organically modified layered silicate comprises a smectite clay mineral.

10. The mycotoxin adsorbent of claim 1 wherein the organically modified layered silicate comprises a montmorillonite-containing clay.

11. The mycotoxin adsorbent of claim 2 wherein the organically modified layered silicate comprises a montmorillonite-containing clay.

12. The mycotoxin adsorbent of claim 1 wherein the organically modified layered silicate comprises a bentonite clay.

13. The mycotoxin adsorbent of claim 2 wherein the organically modified layered silicate comprises a bentonite clay.

14. The mycotoxin adsorbent of claim 1 wherein no more than 75 percent of exchangeable cations of the layered silicate which has been organically modified are exchanged with a quaternary onium compound.

15. The mycotoxin adsorbent of claim 1 wherein about 2 to about 15 percent of the exchangeable cations of the layered silicate which has been organically modified are exchanged with quaternary onium compounds.

16. The mycotoxin adsorbent of claim 1 wherein about 2 to about 10 percent of the exchangeable cations of the layered silicate which has been organically modified are exchanged with quaternary onium compounds.

17. The mycotoxin adsorbent of claim 2 wherein the organically modified layered silicate comprises from about 0.5 to about 30 weight percent of the adsorbent.

18. The mycotoxin adsorbent of claim 2 wherein the organically modified layered silicate comprises from about 0.5 to about 20 weight percent of the adsorbent.

19. The mycotoxin adsorbent of claim 2 wherein the organically modified layered silicate comprises from about 0.5 to about 10 weight percent of the adsorbent.

20. A mycotoxin adsorbent comprising
an organically modified (organophilic) layered silicate comprising a quaternary onium compound, wherein said quaternary onium compound includes at least a $C_{14}$ to $C_{18}$ alkyl group and an aromatic substituent, and wherein about 2 to about 30 percent of exchangeable cations of the layer silicate are exchanged with quaternary onium compounds.

21. A premix for production of a feed additive comprising the mycotoxin adsorbent of claim 1 containing more than 50 percent organically modified layered silicate.

22. A process for the adsorption of mycotoxins in feeds comprising treating the feeds with the mycotoxin adsorbent of claim 1.

23. A process for the adsorption of mycotoxins in feeds comprising treating feeds with the mycotoxin adsorbent of claim 2.

* * * * *